United States Patent
Alford

[11] 3,815,948
[45] June 11, 1974

[54] DEFLECTOR WALL
[76] Inventor: Thomas E. Alford, Det. 3, 7122nd Bestg. Sq. CMR Box 418, APO New York, N.Y. 09009
[22] Filed: Nov. 24, 1972
[21] Appl. No.: 309,615

[52] U.S. Cl............... 296/1 S, 105/2 R, 280/150 R
[51] Int. Cl............................................. B60j 9/04
[58] Field of Search ................. 296/1 S, 96, 26, 27; 105/2 R, 2 A; 280/150 R; 293/62

[56] References Cited
UNITED STATES PATENTS
2,984,512  5/1961  Shaginaw............................. 293/62
3,239,267  3/1966  Reynolds............................ 296/1 S
3,425,740  2/1969  De Vaughn......................... 296/1 S Primary Examiner—Philip Goodman
Assistant Examiner—John A. Carroll
Attorney, Agent, or Firm—Richards, Harris & Medlock

[57] ABSTRACT

When towing a travel trailer, recreational vehicle or motor home, complex wind disturbances are created immediately in front of the trailer. These wind disturbances often induce instability in the trailer which is transmitted to the towing vehicle thereby making handling of the rig difficult and sometimes dangerous. To minimize the instability in trailer towing due to wind disturbances at the front thereof, a removable deflector wall extends to form a wedged shaped wind deflector to streamline the movement of air around and past the front of a towed trailer. This deflector wall includes two panels one hingedly mounted to each of the opposite leading vertical corners of the trailer. The panels are stored when not in use against the trailer sides or track pairs. In one configuration of the deflector wall, an upper and lower section is employed.

15 Claims, 5 Drawing Figures

PATENTED JUN 11 1974　　3,815,948

DEFLECTOR WALL

This invention relates to travel trailers and recreational vehicles, and more particularly to a removable deflector for streamlining the wind flow around and past a towed trailer.

By far the majority of travel trailers and recreational vehicles in use today have a design incorporating a blunt front wall. Such a design makes maximum use of the space available and is considered advantageous for this reason. Unfortunately, when towing such a vehicle considerable wind disturbance may develop between the towed trailer and the towing vehicle. This wind disturbance can adversely effect the stability of the entire rig making handling difficult and sometimes dangerous.

Further, most travel trailer and recreational vehicle manufacturers today mount portable gas tanks at the trailer front wall thereby subjecting them to damage by the considerable amount of debris discharged by the rear tires of the towing vehicle. Valves and couplings of these portable gas tanks are thereby subjected to damage that may render the tanks unserviceable when in time of need. A further problem encountered by many who tow travel trailers and recreational vehicles is the damage inflicted on the front panel section of the trailer due to rocks thrown from the rear tires of the towing vehicle. Considering the investment made by most owners of travel trailers and recreational vehicles, this damage to the front panels is a problem that many owners are desirous of eliminating.

A feature of the present invention is to minimize complex wind disturbances when towing a travel trailer or recreational vehicle. A further feature of the present invention is to provide a removable deflector wall for attachment to the leading vertical corners of a travel trailer or recreational vehicle. Still another feature of the present invention is to provide a removable deflector wall for a travel trailer or recreational vehicle to minimize damage to the trailer front panels and gas supply equipment from debris projected by a towing vehicle.

In accordance with the present invention, the above features are accomplished by a removable deflector wall attached to the leading vertical corners of a trailer or recreational vehicle. This deflector wall comprises inexpensive panels removably hinged to the leading corners of the vehicle. The panels are joined together at a supporting mast to form a wedged shaped deflector. When not in use, the panels are stored against the sides of the vehicle on track pairs.

A further advantage of the present invention is the removable and disposable nature of the panels forming the defector wall. A trailer owner need not be overly concerned about damaging these panel deflections as they are easily removed and replaced with new panels. Thus, a trailer owner using the deflector wall of the present invention protects the front panels of his trailer or recreational vehicle while not permanently changing the vehicle's basic configuration, and further protection is provided by panels which are designed to take abuse and are inexpensively replaceable.

A more complete understanding of the invention and its advantages will be apparent from the specification and claims and from the accompanying drawings illustrative of the invention.

Referring to the drawings.

Figure 1:
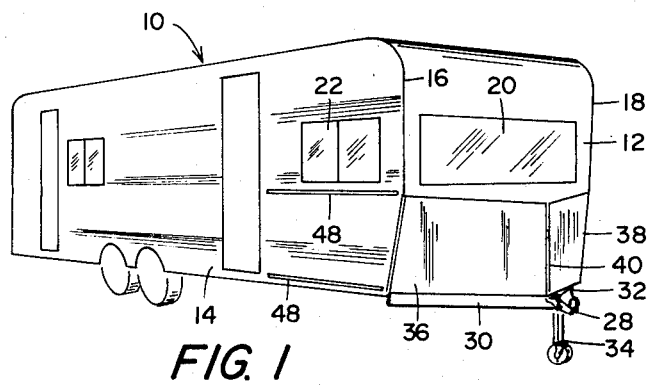
FIG. 1 is a isometric of a lower deflector wall positioned in place for trailering.

Referring to the figures, there is shown in FIG. 1 a recreational vehicle 10 of conventional construction having a relatively flat front wall 12 joined to side walls 14 at leading edges 16 and 18. In the front wall 12 there is located a window 20 and in the side wall 14 there is at least one window 22. As illustrated, the recreational vehicle 10 is of a design wherein the front wall 12 is formed substantially at right angles to the side walls 14. Variations in this design include rounded leading edges 16 and 18.

Figure 2:
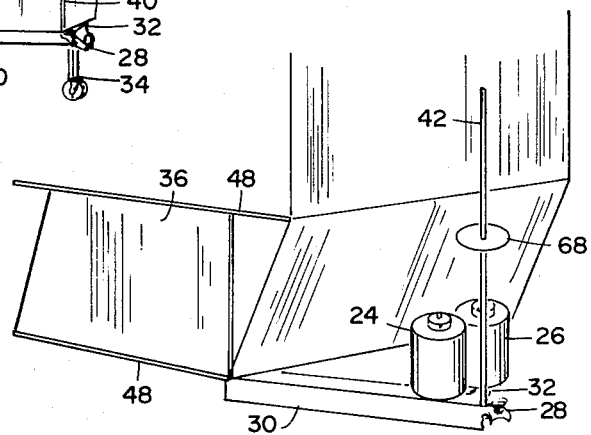
FIG. 2 is an isometric showing the panel sections as stored and the supporting mast at the trailer coupling member.

With all conventional designed trailers, when towing behind a vehicle significant wind turbulence is produced at the trailer front wall 12 to effect the driving stability of the rig. Further, rocks and other debris projected from the rear tires of the towing vehicle often damage the front wall 12 and in particular the glass of the window 20. As also shown in FIG. 2, such missiles as projected by the rear tires of a towing vehicle may also damage and render inoperable gas tanks 24 and 26 and associated valving for providing fuel to service utilities within a vehicle 10.

To tow the recreational vehicle 10, a towing coupling is attached to the vehicle frame (not shown) and comprises a ball coupler 28 welded or otherwise secured to coupling members 30 and 32. These coupling members 30 and 32 also support a mounting bracket for the gas tanks 24 and 26. To support the trailer when in a parked position at a park site, a dolly wheel 34 is also attached to the members 30 and 32. The above coupling construction is recognized as being in accordance with conventional trailer design.

To reduce wind turbulence and minimize damage to the front wall 12 of the trailer 10, panel sections 36 and 38 are hinged to the leading edges 16 and 18, respectively, and join together at a hinge 40 to form a wedge-shaped wind breaker extending before the front wall. At the hinge 40, the panel sections 36 and 38 are supported by a mast 42 extending vertically upward from the apex of the coupling members 30 and 32.

Figure 3:
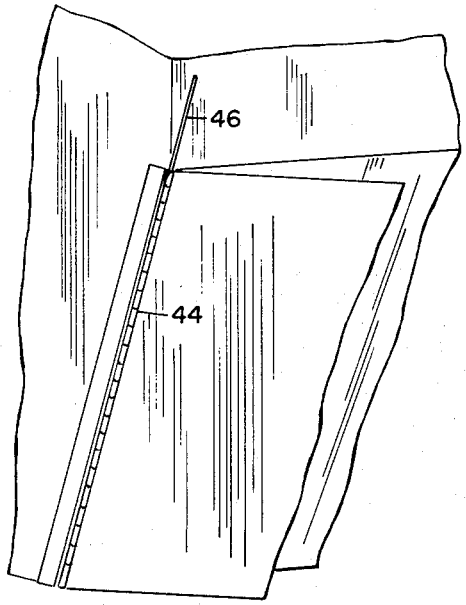
FIG. 3 is a detail of the attachment of one panel of the deflector wall to the vertical leading corner of a trailer.

When in the wind break position, each of the panels 36 and 38 is hinged to the leading edge of the front wall 12 by means of full length hinges, such as hinge 44 of FIG. 3 for coupling the panel 36 to the side wall 14. One part of the hinge 44 is fastened to the side wall of the vehicle 10 and the other part is attached to the panel 36. To assemble the panel sections to the vehicle, a hinge pin 46 is inserted into place between the two hinge parts. To accommodate a tapered leading edge of the front wall 12, the hinged end of the panel sections are formed at an angle with respect to the upper and lower parallel edges, as best illustrated in FIG. 3.

To support the panel sections 36 and 38 when in a wind break position, the lower edge of the panels is supported on the coupling members 30 and 32, respectively. In this manner, and considering the support provided by the mast 42 and the leading edge hinge 44, a rigid wedge-shaped structure is formed leading the front wall 12. The wedge-shaped configuration reduces the wind turbulence at the front of the recreational vehicle when towed. Further, the panel sections 36 and 38 provide protection to the front wall from missiles and other objects discharged by the rear tires of the towing vehicle.

With the recreational vehicle 10 at a park site, the panel sections 36 and 38 are not required and may be stored for easier access to the gas tanks 24 and 26. To store the panel sections 36 and 38, a parallel track pair 48 is attached to the side wall 14 of the vehicle 10. Although only a single track pair for the panel section 36 is illustrated in the FIGURES, a similar arrangement is provided on the side wall opposite from that shown for storage of the panel section 38.

To store the panel sections, the hinge pin 46 is removed from the hinge 44 and the pin of the hinge 40 is removed to disconnect the two panels from the mast 42. The panel 36 then slides in the track pair 48 for storage against the side wall 14 and the panel 38 slides in a similar track pair for storage on the opposite side of the vehicle 10. As an alternate to storing the panel sections in tracks against the side walls of the vehicle 10, the hinge pin 46 for the hinge 44 of the panel sections 36 and 38 are removed. Both panels are then stored as a section by folding against each other by means of the hinge 40; storage may then be within the vehicle or in a storage rack below the vehicle floor.

Figure 4:
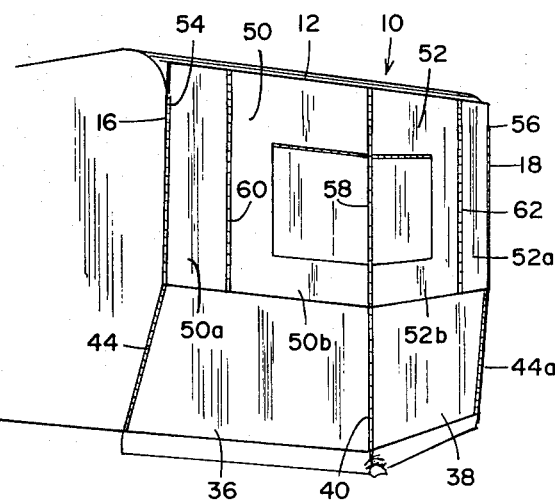
FIG. 4 is an isometric of a full deflector wall comprising upper and lower panel wall sections.
Figure 5:
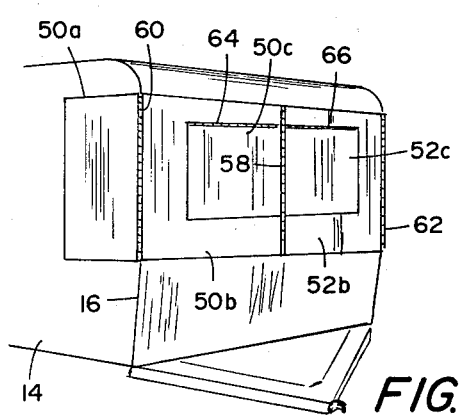
FIG. 5 is an isometric of the upper and lower panels in a stored position in an embodiment where the deflection wall comprises only the upper section.

Referring to FIGS. 4 and 5, there is shown an alternate embodiment of the invention wherein upper and lower panel sections are assembled to the leading edges of a recreational vehicle to form a wind breaker extending over the entire front wall. In FIG. 4, the panel sections are illustrated in the wind break position for towing and include lower panel sections 36 and 38 attached to the leading edges 16 and 18 of the recreational vehicle 10 by means of hinges 44 and 44a. The panel sections 36 and 38 are joined at an apex formed thereby by means of a hinge 40 to form a wedge-shaped configuration. Upper panel sections 50 and 62 are also attached to the leading edges 16 and 18, respectively, of the front wall 12. The upper panel section 50 is attached to the leading edge 16 by means of a hinge 54 and the upper panel section 52 is attached to the leading edge 18 by means of a hinge 56. The panels are joined at the apex formed thereby by means of a hinge 58 to the support mast 42 (FIG. 2), not shown in FIG. 4. In the embodiment shown in FIG. 4, the upper panel section 50 is of two sub-sections 50a and 50b joined by a hinge 60. Similarly, the upper panel section 52 is formed of two-sections 52a and 52b joined by means of a hinge 62.

Referring to FIG. 5, where only the upper portion of the wind break is shown, when in the stowed position the panel sub-sections 50b and 52b lay flat against the front wall 12. The panel sub-section 50a lays flat against the side wall 14 at the hinge connection. A similar arrangement is provided for the panel sub-section 52a. The side sub-sections and the front sub-sections of the upper panel may be stored on tracks as shown in FIG. 2 or other supporting means. With the storage arrangement as illustrated in FIG. 5, the upper panel sections 50 and 52 remain hinged together when both in the extended position for towing and in the stowed position at a park site.

As illustrated in FIG. 1, the front wall 12 includes a window 20. With the upper panel sections 50 and 52 in the stowed position, this window is covered. As part of each of the panel sections 50 and 52, there is an awning sub-section 50c and 52c respectively, hinged to the sub-sections 50b and 52b by means of a hinge 64 or 66. The awning sub-sections 50c and 52c are rotated about the hinges 64 and 66 to form a protective awning for the window 20 when in a park site. When the panel sections are assembled for towing, the awning sub-sections 50c and 52c are locked into the position illustrated in FIG. 4 and with the entire panel sections 50 and 52 provide protection for the front wall 12 and the window 20. In addition, the upper panel sections 50 and 52 along with the lower panel sections 36 and 38 reduce wind turbulence when towing.

To support the upper panel sections 50 and 52 when in an extended position, a support bracket 68 (FIG. 2) is attached to the mast 42 at a position just above the upper edge of the lower panel sections 36 and 38. In the extended position as illustrated in FIG. 4, the upper panel sections 50 and 52 are supported by the bracket 68.

In a preferred embodiment of the invention, each of the hinges between the various panels are full length, as illustrated in FIG. 3. This provides rigidity to the entire assembly when in a wind break position. Full length hinges (sometimes known as "piano" hinges) add rigidity to the various panel sections to minimize deflection and warping due to wind pressure.

While several embodiments of the invention, together with modifications thereof, have been described in detail herein and shown in the accompanying drawings, it will be evident that various further modifications are possible without departing from the scope of the invention.

What is claimed is:

1. A deflector wall for a recreational vehicle having opposite leading corners at the juncture of opposed side walls and a front wall and further including a structural member positioned from the front wall, comprising in combination:

a wall section including a first panel for attachment to one leading corner of the recreational vehicle and a second panel for attachment to the opposite leading corner of the vehicle, storage track pairs individually disposed on one side wall of the recreational vehicle to receive one of the panels in each track pair of storage thereof, and a center support mast mounted to the structural member of the recreational vehicle and forming an apex and support for the two panel sections when extended from said track pairs to a deflector position.

2. A deflector wall for the recreational vehicle as set forth in claim 1 wherein the two panels of the wall section are pinned together at said center support mast when in a deflector position.

3. A deflector wall for a recreational vehicle as set forth in claim 2 wherein each of said panels are planar and when extended into a deflector position form a substantially wedge shaped configuration across the front of the recreational vehicle.

4. A deflector wall for a recreational vehicle as set forth in claim 1 including a full length hinge at each leading edge of the recreational vehicle for attachement of the respective panel of the wall section.

5. A deflector wall for a recreational vehicle having opposite leading corners at the juncture of opposed side walls and a front wall and further including a structural member positioned from the front wall, comprising in combination:
   a lower wall section including a first panel for attachment to one leading corner of the recreational vehicle and a second panel for attachment to the opposite leading corner of the vehicle,
   storage track pairs disposed on each side wall of the recreational vehicle to receive one of the panels in each track pair for storage thereof,
   an upper wall section including a first panel for attachment to one leading corner of the recreational vehicle and a second panel for attachment to the opposite leading corner of the vehicle, and
   a center support mast mounted to the structural member of the recreational vehicle and forming an apex and support for the two panels of the lower section when extended from said track pair to a deflector position and having a flange fastened thereto to form a ledge for support of the two panels of the upper section when in an extended deflection position.

6. A deflector wall for a recreational vehicle as set forth in claim 5 wherein the two panels of the lower section and the two panels of the upper section are pinned together at said center support mast.

7. A deflector wall for a recreational vehicle as set forth in claim 6 wherein each of the panels of the upper and lower sections are planar and when extended into a deflector position form a substantially wedge shaped configuration across the front of the recreational vehicle.

8. A deflector wall for removable attachement to the leading vertical corners of a recreational vehicle, comprising in combination:
   a first panel for pivotal attachment to one leading vertical corner of the recreational vehicle,
   a second panel for pivotal attachment to the opposite leading vertical corner of the recreational vehicle,
   a support mast fastened to a trailer coupling member and including a panel support, and
   separable pivot means for attaching the first and second panels together at said support mast when attached to the respective vertical corners of the recreational vehicle.

9. A deflector wall for removable attachment to the leading vertical corners of a recreational vehicle as set forth in claim 8 including track pairs fastened to the outer side walls of the recreational vehicle on opposite sides thereof for storage of said first and second panels.

10. A deflector wall for attachment to the leading vertical corners of a recreational vehicle as set forth in in claim 9 wherein said panels are pivotally attached to the leading vertical corners of the recreational vehicle by hinges extending the full width of the panel.

11. A deflector wall for removable attachment to the leading vertical corners of a recreational vehicle as set forth in claim 8 wherein each said panel comprises two sections hinged together for storage of one section against the trailer side wall and the second section against the front wall.

12. A deflector wall for removable attachment to the leading vertical corners of a recreational vehicle as set forth in claim 11 wherein the sections for storage against the trailer front wall include a horizontally hinged insert for pivoting into an extended position with said section in a stored position as an awning for a front window of the recreational vehicle.

13. A deflector wall for removable attachment to the leading vertical corners of a recreational vechicle, comprising in combination:
   a first lower panel for pivotal attachment to one leading vertical corner of the recreational vehicle,
   a second lower panel for pivotal attachment to the opposite leading vertcial corner of the recreational vehicle,
   a support mast fastened to the trailer coupling member and including a panel support,
   first separable pivot means for attaching the first and second lower panels together at said support mast when attached to the respective vertical corners of the recreational vehicle,
   a first upper panel for pivotal attachment to one leading vertical corner of the recreational vehicle,
   a second upper panel for pivotal attachment to the opposite leading vertical corner of the recreational vehicle, and
   second separable pivot means for attaching the first and second upper panels together at said support mast when attached to the respective vertical corners of the recreational vehicle.

14. A deflector wall for removable attachment to the leading vertical corners of the recreational vehicle as set forth in claim 13 wherein each said upper panel comprises two sections hinged together for storage of one section against the trailer side wall and the second section against the front wall.

15. A deflector wall for removable attachment to the leading vertical corners of a recreational vehicle as set forth in claim 14 wherein the section for storage against the trailer front wall includes a horizontally hinged insert for rotating into an extended position with said section in a stored position as an awning for a front window of the recreational trailer.

* * * * *